US008819271B2

(12) United States Patent
Hilving et al.

(10) Patent No.: US 8,819,271 B2
(45) Date of Patent: Aug. 26, 2014

(54) SYSTEM AND METHOD TO ACCESS AND USE LAYER 2 AND LAYER 3 INFORMATION USED IN COMMUNICATIONS

(75) Inventors: James P. Hilving, Grand Blanc, MI (US); James W. Forsyth, Royal Oak, MI (US); David A. Henry, Dallas, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1668 days.

(21) Appl. No.: 11/753,238

(22) Filed: May 24, 2007

(65) Prior Publication Data

US 2008/0295158 A1    Nov. 27, 2008

(51) Int. Cl.
*G06F 15/16*    (2006.01)
(52) U.S. Cl.
USPC ........... 709/238; 709/224; 709/230; 709/220; 709/223; 709/249; 370/253; 370/469; 713/166; 717/139; 715/737
(58) Field of Classification Search
USPC ................. 709/224, 230, 238, 220, 223, 249; 370/253, 469, 252, 254, 395.52; 713/166; 717/139; 715/737
See application file for complete search history.

(56) References Cited

U.S. PATENT DOCUMENTS

| | | | |
|---|---|---|---|
| 6,442,144 B1 | 8/2002 | Hansen et al. | |
| 6,516,345 B1* | 2/2003 | Kracht | 709/220 |
| 6,603,770 B2 | 8/2003 | Lin et al. | |
| 7,401,326 B1* | 7/2008 | Durham et al. | 717/139 |
| 7,450,525 B2* | 11/2008 | Son et al. | 370/254 |
| 7,480,710 B1* | 1/2009 | Olson et al. | 709/223 |
| 7,515,546 B2* | 4/2009 | Gaspard et al. | 370/252 |
| 7,631,064 B1* | 12/2009 | Gray | 709/224 |
| 7,701,951 B2* | 4/2010 | Chapman et al. | 370/395.52 |
| 7,720,940 B1* | 5/2010 | Wilsey et al. | 709/220 |
| 7,733,906 B2* | 6/2010 | Raman et al. | 370/469 |
| 7,765,328 B2* | 7/2010 | Bryers et al. | 709/249 |
| 7,856,599 B2* | 12/2010 | Proulx et al. | 715/737 |
| 7,870,246 B1* | 1/2011 | Davis et al. | 709/224 |
| 7,885,233 B2* | 2/2011 | Nagarajan et al. | 370/331 |
| 7,895,308 B2* | 2/2011 | Tindall et al. | 709/223 |
| 8,000,698 B2* | 8/2011 | Wolman et al. | 455/423 |
| 8,645,567 B2* | 2/2014 | Shah et al. | 709/238 |
| 2003/0108051 A1 | 6/2003 | Bryden et al. | |
| 2003/0154399 A1* | 8/2003 | Zuk et al. | 713/201 |
| 2004/0071164 A1* | 4/2004 | Baum | 370/469 |

(Continued)

OTHER PUBLICATIONS

Byers et al. "Scalable Coordination Techniques for Distributed Network Monitoring." Boston University, 2005. Web.*

(Continued)

*Primary Examiner* — Anthony Mejia
(74) *Attorney, Agent, or Firm* — Akerman LLP; Michael K. Dixon; Roy P. Zachariah

(57) ABSTRACT

A system and method can be used to collect communication information including Layer 2 and Layer 3 information during normal communications between devices or other elements within a network. In a particular embodiment, the information can be generated as address resolution protocol tables and media access control tables, which are used to keep track of which elements are connected to other elements and to map network addresses to media access control identifiers. The communication information can be used in performing an action, such as servicing the system, auditing the system, checking for security breaches or policy violations, or other suitable action.

19 Claims, 12 Drawing Sheets

(56) References Cited

U.S. PATENT DOCUMENTS

| | | | |
|---|---|---|---|
| 2004/0193705 A1* | 9/2004 | To et al. | 709/223 |
| 2005/0010766 A1* | 1/2005 | Holden et al. | 713/166 |
| 2005/0027881 A1* | 2/2005 | Figueira et al. | 709/238 |
| 2005/0108407 A1 | 5/2005 | Johnson et al. | |
| 2005/0246450 A1* | 11/2005 | Enko et al. | 709/230 |
| 2006/0034283 A1* | 2/2006 | Ko et al. | 370/392 |
| 2006/0047803 A1* | 3/2006 | Shaik et al. | 709/224 |
| 2006/0047907 A1* | 3/2006 | Shiga et al. | 711/114 |
| 2006/0168206 A1* | 7/2006 | Choong et al. | 709/224 |
| 2006/0294216 A1* | 12/2006 | Swanson et al. | 709/223 |
| 2007/0002899 A1* | 1/2007 | Raman et al. | 370/469 |
| 2007/0047959 A1* | 3/2007 | Thomas et al. | 398/72 |
| 2007/0086456 A1 | 4/2007 | Kim et al. | |
| 2007/0156877 A1* | 7/2007 | Krishnan et al. | 709/223 |
| 2007/0204154 A1* | 8/2007 | Swander et al. | 713/166 |
| 2008/0263191 A1* | 10/2008 | Shah et al. | 709/223 |
| 2010/0135186 A1* | 6/2010 | Choong et al. | 370/253 |
| 2010/0135307 A1* | 6/2010 | Nakagawa | 370/395.53 |
| 2011/0004913 A1* | 1/2011 | Nagarajan et al. | 726/1 |

OTHER PUBLICATIONS

He, T., Blum, B. M., Stankovic, J. A., and Abdelzaher, T. 2004. AIDA: Adaptive application-independent data aggregation in wireless sensor networks. ACM Trans. Embed. Comput. Syst. 3, 2 (May 2004), 426-457.*

Lentz, Chris. "802.11b Wireless Network Visualization and Radiowave Propagation Modeling." Dartmouth College, Jun. 2003. Web.*

Estrin, D.; Handley, M.; Heidemann, J.; McCanne, S.; Ya Xu; Yu, H.; , "Network visualization with Nam, the VINT network animator," Computer, vol. 33, No. 11, pp. 63-68, Nov. 2000.*

* cited by examiner

02:00:00:00:EC

| Element | Port/VLAN | Port Name | MAC | Make | IP Address | DNS |
|---|---|---|---|---|---|---|
| isr2.site1 | V150 | DSL LAN#1/10.10.73.173/28 | 02:00:00:00:EC | Redback Networks | 10.10.73.173 | rbck2-g1-0.site1 |
| isr2.site1 | Gi2/7 | VLAN60_RBK3_3/1 | 02:00:00:00:EC | Redback Networks | layer 2 | |
| isr1.site1 | V150 | DSL LAN#1/10.10.73.173/28 | 02:00:00:00:EC | Redback Networks | 10.10.73.173 | rbck2-g1-0.site1 |
| isr1.site1 | Po1 | Trunk Bundle Interface | 02:00:00:00:EC | Redback Networks | layer 2 | |

02:00:00:00:47

| Element | Port/VLAN | Port Name | MAC | Make | IP Address | DNS |
|---|---|---|---|---|---|---|
| isr2.site1 | Po1 | Trunk Bundle Interface | 02:00:00:00:47 | Redback Networks | layer 2 | |
| isr2.site1 | V160 | DSL LAN#2/10.10.36.164/28 | 02:00:00:00:47 | Redback Networks | 10.10.36.164 | rbck2-g3-1.site1 |
| isr1.site1 | Gi2/7 | VLAN60_RBK3_1/0 | 02:00:00:00:47 | Redback Networks | layer 2 | |
| isr1.site1 | V160 | DSL LAN#2/10.10.36.164/28 | 02:00:00:00:47 | Redback Networks | 10.10.73.173 | rbck2-g3-1.site1 |

02:00:00:00:47

| Element | Port/VLAN | Port Name | MAC | Make | IP Address | DNS |
|---|---|---|---|---|---|---|
| isr2.site1 | V150 | DSL LAN#1/10.10.56.148/28 | 02:00:00:00:47 | Redback Networks | 10.10.56.148 | rbck1-g1-0.site1 |
| isr2.site1 | Gi2/6 | VLAN60_RBK2_3/1 | 02:00:00:00:47 | Redback Networks | layer 2 | |
| isr1.site1 | V150 | DSL LAN#1/10.10.56.148/28 | 02:00:00:00:47 | Redback Networks | 10.10.56.148 | rbck1-g1-0.site1 |
| isr1.site1 | Po1 | Trunk Bundle Interface | 02:00:00:00:47 | Redback Networks | layer 2 | |

Filter On: site 1
Filter  Clear Filter
OR
Filter by POP: site 1

By POP
 site 1
 All Devices
  rtr1.site1
  rtr2.site1
  diarr1.site1
  isr1.site1
  isr2.site1
By DNS
By MAC
By IP

| | | | 10.10.73.123 -> 02:00:00:00:00:00 | | | | |
|---|---|---|---|---|---|---|---|
| Element | Port/VLAN | Port Name | MAC | Make | IP Address | DNS |
| distr1.site1 | Fa0/0/0 | Transit Network#1 VLAN 30 Cor1 4/4 | 02:00:00:00:00:00 | Cisco Systems, Inc. | 10.10.73.123 | distr1-fa0-0.site1 |
| isr2.site1 | Vl30 | Transit LAN#1 / 10.10.73.173 | 02:00:00:00:00:00 | Cisco Systems, Inc. | 10.10.73.123 | distr1-fa0-0.site1 |
| isr1.site1 | Vl30 | Transit LAN#1 / 10.10.73.173 | 02:00:00:00:00:00 | Cisco Systems, Inc. | 10.10.73.123 | distr1-fa0-0.site1 |
| rtr1.site1 | Gi1/0 | GE_Vlan30 TRANSIT-LAN1_AK00H501HUB_G2/2_CMID0000_isr2.site1 | 02:00:00:00:00:00 | Cisco Systems, Inc. | 10.10.73.123 | distr1-fa0-0.site1 |
| rtr2.site1 | Gi1/0 | GE_Vlan30 TRANSIT-LAN1_AK00H501HUB_G2/3_CMID0000_isr2.site1 | 02:00:00:00:00:00 | Cisco Systems, Inc. | 10.10.73.123 | distr1-fa0-0.site1 |
| isr2.site1 | Fa3/4 | distr1-fa0-0 / VLAN 30 | 02:00:00:00:00:00 | Cisco Systems, Inc. | layer2 | |
| isr1.site1 | Po1 | Trunk Bundle Interface | 02:00:00:00:00:00 | Cisco Systems, Inc. | layer2 | |

Filter On: site 1
Filter   Clear Filter
OR
Filter by POP site 1 ▶

By POP
By DNS
By MAC
02:00:00:00:00:32
02:00:00:00:00:3C
02:00:00:00:00:46
02:00:00:00:00:4B
02:00:00:00:00:4F
02:00:00:00:00:50
02:00:00:00:00:51
02:00:00:00:00:5A
02:00:00:00:00:5C
02:00:00:00:00:80
10.10.73.123
distr1-fa0-0.site1
02:00:00:00:00:C0
02:00:00:00:00:AE
02:00:00:00:00:DB

| Element | Port/VLAN | Port Name | MAC | Make | IP Address | DNS |
|---|---|---|---|---|---|---|
| isr2.site1 | Vl90 | FW LAN#1 OUTSIDE/VLAN 90 / 10.10.73.173/29 | 02:00:00:00:78 | Sun Microsystems, Inc. | 10.10.73.123 | fw0.site1 |
| isr1.site1 | Po1 | Trunk Bundle Interface | 02:00:00:00:78 | Sun Microsystems, Inc. | layer 2 | |
| isr2.site1 | Fa3/37 | VLAN 10_NA2_1/2/2 | 02:00:00:00:78 | Sun Microsystems, Inc. | layer2 | |

Filter On: site 1
Filter  Clear Filter
OR
Filter by POP: site 1 ▼

By POP
By DNS
By MAC
By IP
10.10.52.28
10.10.52.103
10.10.73.123
02:00:00:00:78
nas2-e-1-2-2.site1
10.10.73.148
10.10.73.226
10.10.88.25

*FIG. 12*

SYSTEM AND METHOD TO ACCESS AND USE LAYER 2 AND LAYER 3 INFORMATION USED IN COMMUNICATIONS

FIELD OF THE DISCLOSURE

This disclosure relates generally to systems and methods, and more particularly to systems and methods that access and use Layer 2 and Layer 3 information used in communications.

DESCRIPTION OF THE RELATED ART

Networks are becoming larger and can include a complicated array of different elements. As the size of the network grows, difficulty arises in performing service, audits, security checks, other related operations, or any combination thereof. Part of the problem occurs due to information being available only to certain devices within a local area network. For example, Layer 2 devices do not need to use Layer 3 information, and vice versa. Thus, inherently the information to be used for maintaining auditing, checking security, or the like can reside in numerous different locations throughout the network.

Automated systems can be used to generate a graphical map of how elements are connected within a network. The automated systems may perform adequately within an enterprise, but can be too slow to be useful for service providers (e.g., internet service providers, phone companies, cable companies, etc.) because the service providers have much more complicated systems with many millions of subscribers in hundreds of different locations, as opposed to an enterprise that may have about 1000 employees in about 5 different locations. An automated system could take days to run to provide useful information for the service provider, assuming the automated system can even handle the volume of data.

Further, the automated systems may not check on the integrity or consistency of the information. If one element or table can provide information that is not available on another element, the map can still be generated; however, the missing or inconsistent data may not be flagged or otherwise noted. Therefore, the graphic map from an automated system may have only a limited usefulness.

BRIEF DESCRIPTION OF THE DRAWINGS

Skilled artisans appreciate that elements in the figures are illustrated for simplicity and clarity and have not necessarily been drawn to scale. For example, the dimensions of some of the elements in the figures may be exaggerated or minimized relative to other elements to help improve understanding of embodiments of the invention. Embodiments incorporating teachings of the present disclosure are illustrated and described with respect to the drawings presented herein.

FIGS. 7 to 12 include screen shots from a user interface to provide information regarding the system of FIG. 1.

The use of the same reference symbols in different figures indicates similar or identical items.

DETAILED DESCRIPTION

Figure 1:
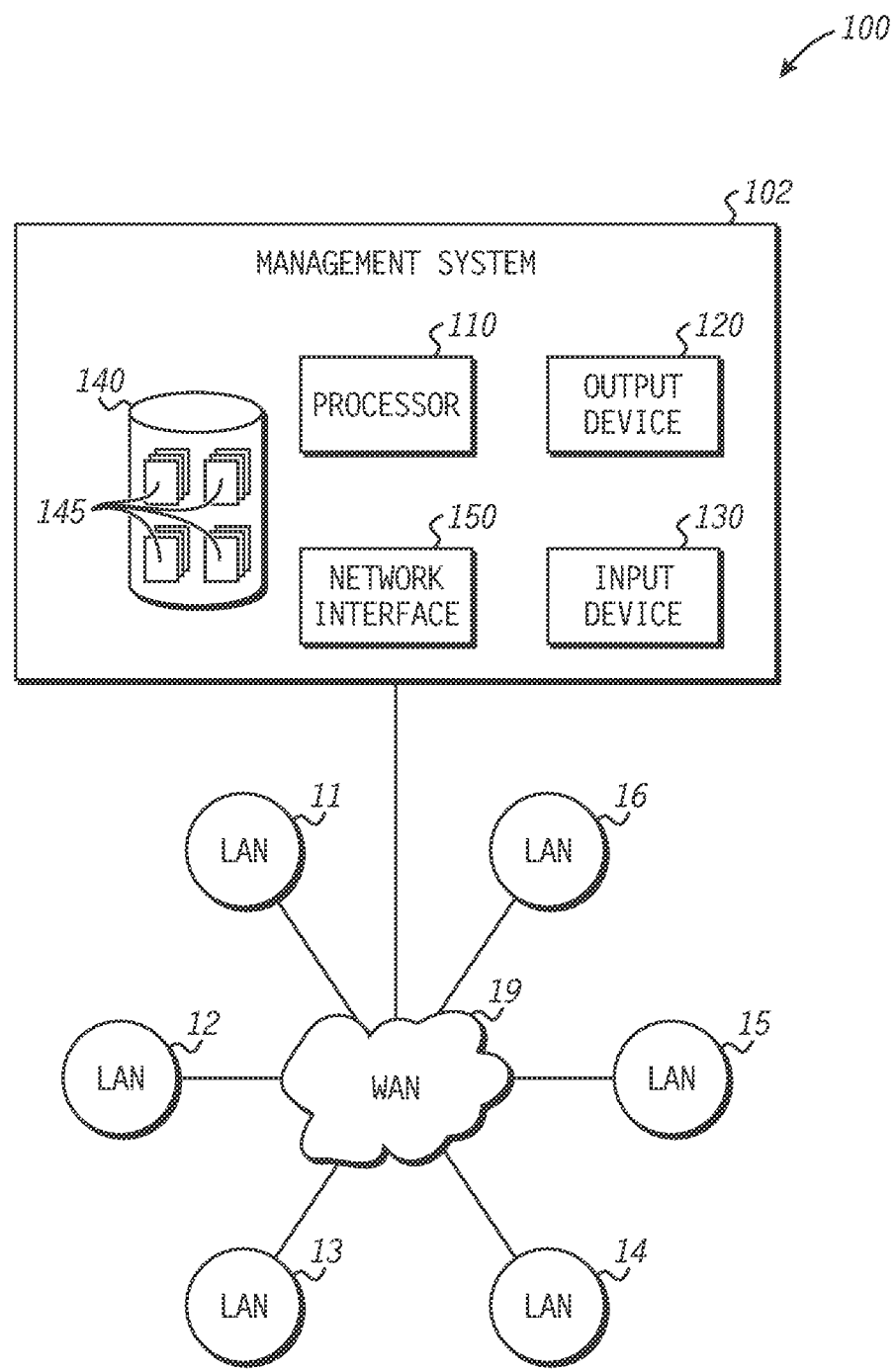
FIG. 1 includes a functional block diagram of a system used by a service provider including a management system and local area networks.

A system and method can be used to collect communication information including Layer 2 and Layer 3 information during normal communications within a network. In a particular embodiment, the information can be generated as Address Resolution Protocol ("ARP") tables and media access control ("MAC") tables, which are used to keeping track of which elements are connected to other elements and to map network addresses, e.g., Internet protocol ("IP") or proprietary addresses, to MAC identifiers. The communication information can be used in performing an action, such as servicing the system, auditing the system, checking for security breaches, or other suitable action.

In the description below, many details are given with respect to the system, portions of the system, and methods of using the system or portions thereof. The details presented are merely illustrative. After reading this specification, skilled artisans will appreciate that many other embodiments are possible and can be tailored to particular applications, needs, or desires of the users.

As used herein, numbered layers are in reference to the Open System Interface Seven Layer Model. Layer 1 corresponds to the physical layer, Layer 2 corresponds to the data link layer, Layer 3 corresponds to the network layer, etc.

The term "connect" and its variants are used with respect to a direct connection, and the term "coupling" and its variants are used to with respect to direct or indirect connection. Thus, connecting is a subset of coupling. For embodiments in which elements are described as being coupled or have a coupling, a particular embodiment will include the elements be connected or have a connection.

Except as explicitly stated to the contrary, the term "corresponding" is not limited to any particular number, and therefore, the term "corresponding" can refer to a one-to-one correspondence, one-to-many correspondence, many-to-one correspondence, or a many-to-many correspondence.

The term "device" refers to a physical apparatus or component. The term "element" refers to a device, a particular functional portion of a device, a combination of different portions of different devices that collectively provide a function, a logical or virtual apparatus or component. An example of an element includes a server or other host, a router, a firewall, a gateway, a bridge, a switch, or the like.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single device is described herein, more than one device may be used in place of a single device. Similarly, where more than one device is described herein, a single device may be substituted for that one device.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

To the extent not described herein, many details regarding specific materials, processing acts, and circuits are conventional and may be found in textbooks and other sources within the computing, electronics, and software arts.

FIG. 1 illustrates a functional block diagram of an exemplary embodiment of a network, generally designated at 100. In the network 100, a management system 102 is communicatively coupled to a wide area network ("WAN") 19. The management system 102 includes a processor 110, an output device 120 (e.g., a video display, printer, another suitable output device, or any combination thereof), an input device 130 (e.g., a keyboard, a mouse or other electronic pointer, a Universal Serial Bus ("USB") drive, another suitable output device, or any combination thereof), a storage device 140 (e.g., a random access memory, a hard disk drive, a database, another suitable storage device, or any combination thereof), and a network interface 150. The network interface 150 allows the management system to communicate via the WAN 19. A plurality of local area networks ("LANs") 11 to 16 is communicatively coupled to the WAN 19. The details of the LANs 11 to 16 are discussed in more detail with respect to FIG. 2.

The network 100 may be used by a service provider, such as a telecommunications company, an internet service provider, a cable company, a satellite communications provider, other suitable entity or the like that support over a million subscribers supported by over a hundred different local area networks in different geographic regions. In one embodiment, the management system 102 and LANs 11 to 16 are owned, controlled or operated by a single entity. The WAN 19 can include the Internet and may or may not include other network elements that are not illustrated in FIG. 1. In a particular embodiment, each LAN corresponds to a geographic region of subscribers or a logical division (e.g., elements corresponding to a mail server, such as an Microsoft Exchange™-brand server or a post-office protocol ("POP") server). For example, each LAN can correspond to a continent, a state or province, city, portion of a city, or any other suitable division. Alternatively, LANs may be divided by service levels. For example the LAN 11 may be used for subscribers having a basic service level, the LANs 12, 13, and 14 may be used for subscribers having a premium service level, and the LANs 15 and 16 may be used for subscribers having an intermediate service level. After reading this specification, skilled artisans will be able to determine how many LANs are to be implemented and how services will be divided between the LANs. While much of the description below is directed to the LAN 11, skilled artisans appreciate that similar concepts can be extended to the LANs 12 to 16.

Figure 2:
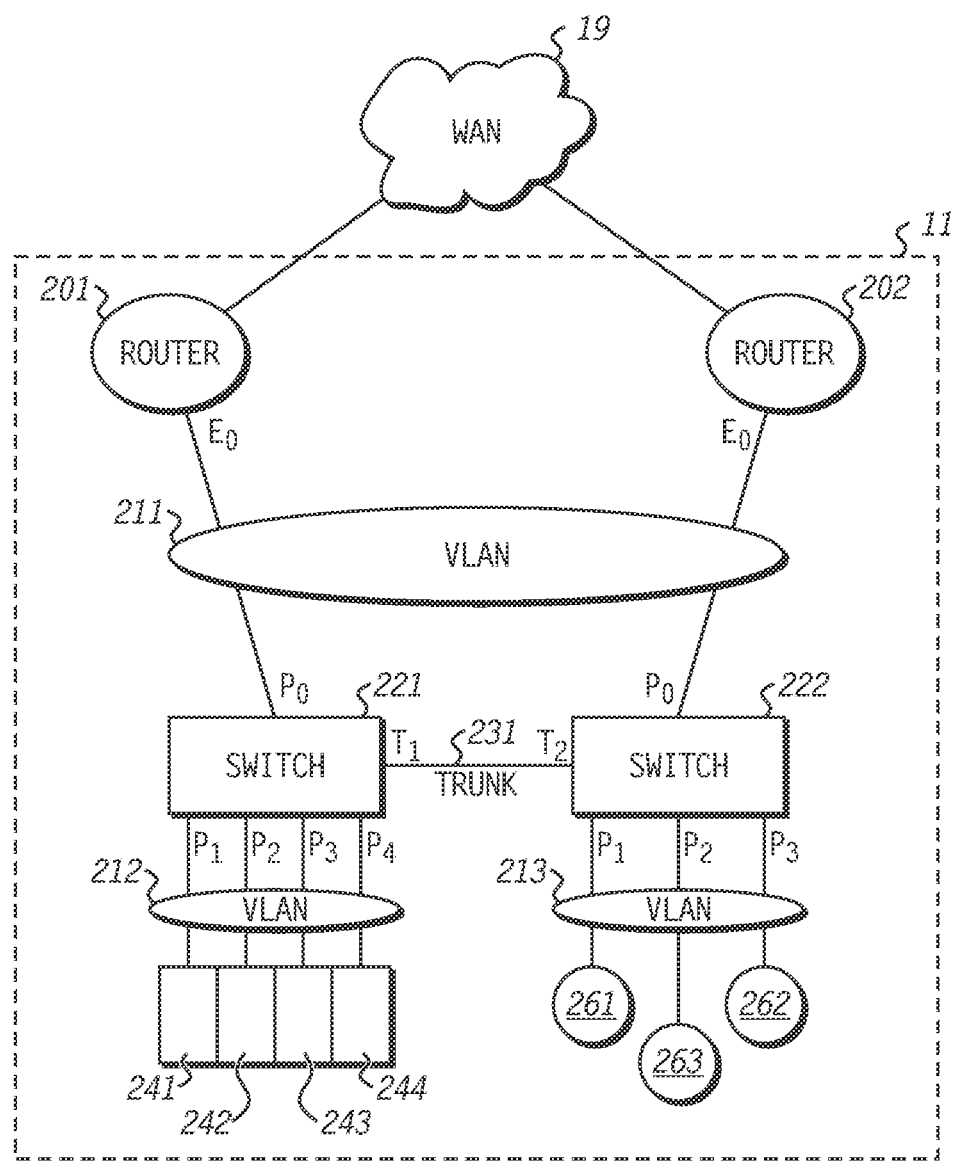
FIG. 2 includes a physical block diagram illustrating a local area network within the system of FIG. 1.

FIG. 2 includes a functional block diagram of the LAN 11 that includes Layer 1, 2, and 3 elements. The LAN 11 includes a router 201 and a router 202 that are coupled to the WAN 19. The router 201 is connected to a switch 221, and more particularly, a port $E_0$ of the router 201 is connected to a port $P_0$ of the switch 221. The router 202 is connected to a switch 222, and more particularly, a port $E_0$ of the router 202 is connected to a port $P_0$ of the switch 222.

The switch 221 is connected to switch 222 via a trunk 231, and more particularly, the trunk port $T_1$ of switch 221 is connected to the trunk port $T_2$ of the switch 222. Elements 241 to 244 are connected to ports $P_1$ to $P_4$ of the switch 221, and elements 261 to 263 are connected to ports $P_1$ to $P_3$ of the switch 222. In one embodiment, the elements 241 to 244 are servers or other hosts, and elements 261 to 263 are aggregate digital subscriber line ("DSL") routers, dial routers, or other routers.

Within the LAN 11, the couplings between the routers 201 and 202 and the switch 221 and 222 correspond to a virtual LAN ("VLAN") 211. The couplings between the switch 221 and the elements 241 to 244 correspond a VLAN 212, and the couplings between the switch 222 and the elements 261 to 263 correspond a VLAN 213.

After reading this specification, skilled artisans appreciate that more, fewer, or different elements may be used for the LAN 11. Also, the elements within the LAN 11 may be parts of separate devices or the same device. For example, the router 202 and the switch 221 can be located in the same device (e.g., a chassis or tower) or could be located in different devices.

The LAN 11 may further include management components that are not illustrated in FIG. 2. For example, the LAN 11 can include a server (not illustrated) that manages the LAN 11 and is under the control of the management system 102 (FIG. 1). The elements within the LAN 11 can be managed using Simple Network Management Protocol (SNMP) communications and can be managed locally within the LAN 11, by the management system 102, or any combination thereof. Additionally, any or all of the elements within the LAN 11 can include an agent that can be used in combination with management components or software outside a particular element. As will be described in more detail below, the agents can be used to collect, generate, or send information available at the elements on which the agents reside.

The routers 201 and 202 and the switches 221 and 222 are traffic handling elements because they handle communications between sources and destinations. For example, a client computer (not illustrated) may be a source sending a request for information to the element 241, which is the destination of the request. The request may be transmitted over the WAN 19, received and forwarded by the router 201, received and forwarded by the switch 221, and received by the element 241, which is the destination of the request. Although the router 201 and the switch 221 receive the request, they are not the intended destination of the request; they are merely handling the request to allow traffic (e.g., the request) to eventually reach the destination.

The traffic handling elements are in a good position to collect valuable communication information regarding the network 100 just from processing routine communications through the network 100. The communication information can include MAC identifiers for the elements, network addresses (e.g., IP addresses) for the elements, and coupling identifiers corresponding to couplings between different elements within the network. Domain name service ("DNS") identifiers (e.g., DNS names) may also be part of the communication information. The use of the LAN 11 to collect useful communication information is described in more detail with respect to the methods as described with respect to FIGS. 3 to 6.

FIGS. 3 to 6 include flow diagrams of methods of using the network 100. The methods can be employed in whole or in part by the network 100. Additionally, the methods can be embodied in various types of encoded logic including software, firmware, hardware, or other forms of digital storage mediums or logic, or any combination thereof, operable to provide all or portions of the methods of FIGS. 3 to 6. More particularly, portions of the methods described herein may be implemented in suitable code that includes instructions to carry out such portions of the methods. The code can be in the form of hardware, firmware, software, or any combination thereof. In one embodiment, the instructions may be lines of assembly code or compiled C++, Java, or other language code. Part or all of the code may be executed by one or more processors or controllers within the network 100 (e.g., on a processor or on one or more software agent(s) (not illustrated) within element(s) of the LAN(s)). In another embodiment, the code may be contained on a data storage device, such as a hard disk drive, magnetic tape, floppy diskette, CD ROM, optical storage device, storage network (e.g., storage network 136), storage device(s), or other appropriate processor readable medium.

In alternative embodiments, one or more operations may be automated or may performed manually. While much of the methods as illustrated in FIGS. 3 to 6 are described with respect to FIGS. 1 and 2, after reading this specification, skilled artisans will appreciate that many other configurations may be used. Thus, the figures are to aid in the understanding of particular embodiments and do not limit the scope of the present invention.

Figure 3:
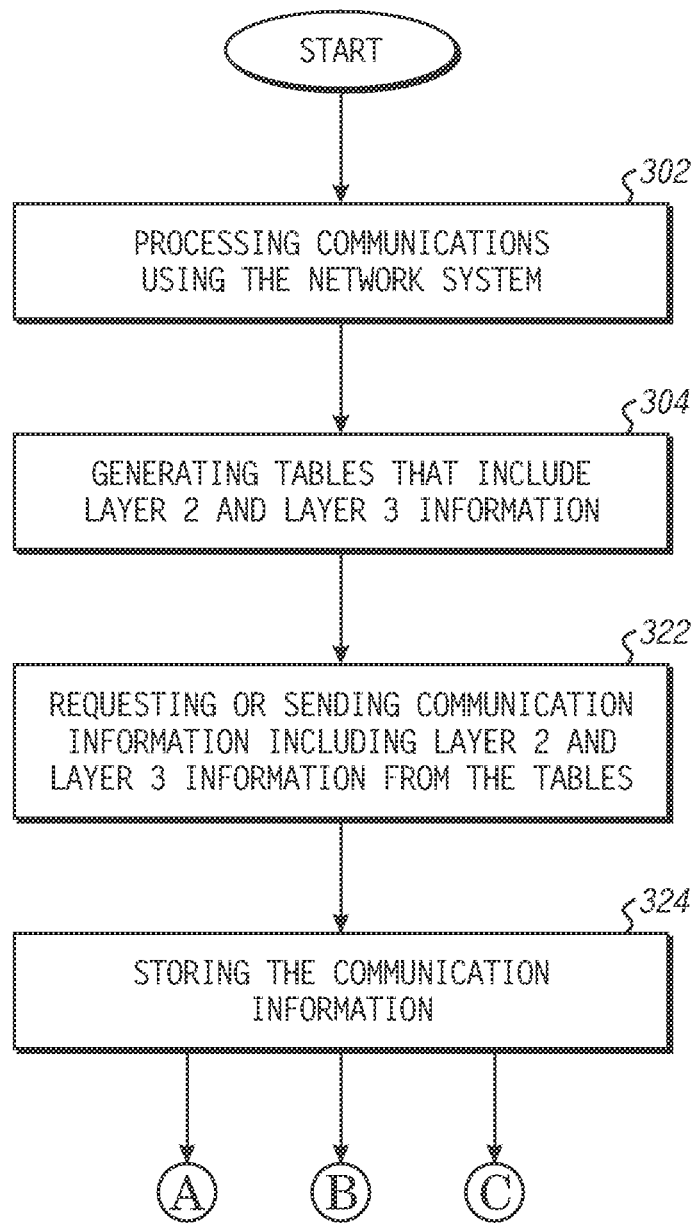
FIGS. 3 to 6 include a flow diagram of a method of the system of FIG. 1 in order to perform an action that uses communication information generated when using the system.

The method can include processing communications using the network and generating tables that include Layer 2 and Layer 3 information, at blocks 302 and 304 of FIG. 3. Referring to the LAN 11, elements within the LAN 11 are coupled together as illustrated in FIG. 2. The communications can occur when an element is initially coupled to another portion of the network, when transmitting, routing, switching, or otherwise processing communications between sources and destinations, or any combination thereof, as described in more detail below.

When an element is coupled to another element within the LAN 11, communications between the elements may take place. For example, element 241 can send a communication that is received by the switch 221, wherein the communication includes the MAC identifier for the element 241. The switch 221 receives the communication at $P_1$ of the switch 221. The MAC identifier allows the element 241 and the switch 221 to communicate at the Layer 2 level. Similarly, other elements make couplings to other ports of the switch 221, and other MAC identifiers are sent by the other elements and received by the switch 221. Additionally, the switch 221 can receive communication information regarding which elements are accessible via trunk 231. The switch 221 creates a MAC table that maps MAC identifiers to particular ports of the switch 221. Table 1 below includes communication information that may be part of the MAC table for the switch 221.

TABLE 1

| Switch 221 MAC Table | |
| --- | --- |
| Element (MAC ID) | Port on Switch 221 |
| Router 201 (MAC) | $P_0$ |
| Router 202 (MAC) | $T_1$ |
| Element 241 (MAC) | $P_2$ |
| Element 242 (MAC) | $P_3$ |
| Element 243 (MAC) | $P_4$ |
| Element 244 (MAC) | $P_5$ |
| Element 261 (MAC) | $T_1$ |

TABLE 1-continued

| Switch 221 MAC Table | |
| --- | --- |
| Element (MAC ID) | Port on Switch 221 |
| Element 262 (MAC) | $T_1$ |
| Element 263 (MAC) | $T_1$ |

From the data in the table in this particular embodiment, the switch 221 is connected to the Router 221 and the elements 241 to 244, and the switch 221 is coupled to, and not directly connected to, the Router 222 and the elements 261 to 263 via the trunk 231. A similar operation occurs with the switch 222 and elements connected to the ports of the switch 222 or otherwise accessible to the switch 222 via the trunk 231. Another MAC table can be generated for the switch 222.

Additional communication occurs where elements within the LAN 11 communicate with devices or other elements at the Layer 3 or network level. For Layer 3 communications, a network address is used. The network address can be an IP address, a proprietary address, or any other suitable address. Address Resolution Protocol ("ARP") tables can be generated to map network addresses to MAC identifiers. The traffic handling elements create ARP tables with respect to each of the VLANs to which they are connected. More specifically, the router 201 will have an ARP table with respect to VLAN 211, the switch 221 will have an ARP table with respect to VLAN 211 that is different from switch 221's ARP table with respect to VLAN 211, and the switch 221 will have another ARP table with respect to VLAN 212. Tables 2 to 4 below include communication information that may be part of the ARP tables for the Router 201 and switch 221.

TABLE 2

| Router 201 ARP Table for VLAN 211 | |
| --- | --- |
| Element (IP Address) | Element (MAC ID) |
| Router 202 (IP) | Router 202 (MAC) |
| Switch 221 (IP) | Switch 221 (MAC) |
| Switch 222 (IP) | Switch 222 (MAC) |

TABLE 3

| Switch 221 ARP Table for VLAN 211 | |
| --- | --- |
| Element (IP Address) | Element (MAC ID) |
| Router 201 (IP) | Router 201 (MAC) |
| Router 202 (IP) | Router 202 (MAC) |
| Switch 222 (IP) | Switch 222 (MAC) |

TABLE 4

| Switch 221 ARP Table for VLAN 212 | |
| --- | --- |
| Element (IP Address) | Element (MAC ID) |
| Element 241 (IP) | Element 241 (MAC) |
| Element 242 (IP) | Element 242 (MAC) |
| Element 243 (IP) | Element 243 (MAC) |
| Element 244 (IP) | Element 244 (MAC) |

Similar operations can be performed with respect to the Router 202 and switch 222 for their corresponding ARP tables with respect to the VLANs 211 and 213. The MAC and ARP tables can be in lightweight directory application protocol ("LDAP"). The MAC and ARP tables are particular examples of communication information.

The method can also include requesting or sending communication information including Layer 2 and Layer 3 information from the tables, at block 322. This action can be achieved many different ways. In one embodiment, the management system 102 can send a request to the elements within the LAN 11 for the information from the MAC or ARP tables or form the MAC or ARP tables themselves. In one particular embodiment, the management system 102 can include an LDAP server that services the LAN 11 or a combination of LANs including the LAN 11. After receiving the request, the appropriate elements within the LAN 11 can send the communication information to the management system 102. Thus, the management system 102 can receive element identifiers of elements within the system network, port or VLAN identifiers, descriptions of port names, MAC identifiers of devices within the system network, makers of the devices, network addresses, DNS identifiers, or any combination thereof.

In another embodiment, the communication information can be sent to the management system 102 by an agent or element within the LAN 11, without the need for a request from the management system 102. In one particular embodiment, each of the traffic handling elements includes an agent that detects when a significant event occurs (e.g., another element is coupled to the network, decoupled from the network, changes state (changes from an active state to a deactivated state), or the like). The agent can be configured to send the information to the management system 102 after the significant event occurs. In still another embodiment, an LDAP server (not illustrated in FIG. 2) may reside within the LAN 11. As significant changes to the LAN 11 occur, the information within the LDAP server can be updated, and the updated information can be sent from the LDAP server within the LAN 11 to the management system 102.

After reading this specification, skilled artisans will appreciate that many other embodiments are possible. The request for the communication information or the sending of the communication information can occurred in response to an occurrence of an event, at a predetermined time interval, or any combination thereof (e.g., information is pushed upon the occurrence of an event, and information is pulled hourly in case of a transmission error during a prior pushing of information).

The method can further include storing the communication information, at block 324 of FIG. 3. The collection information may be stored locally within the LAN 11 or may be stored within the storage device 140 of the management system 102. In a particular embodiment, the management system can be configured such that the storage device 140 is a database, and the communication information is stored as tables within the database.

Figure 4:
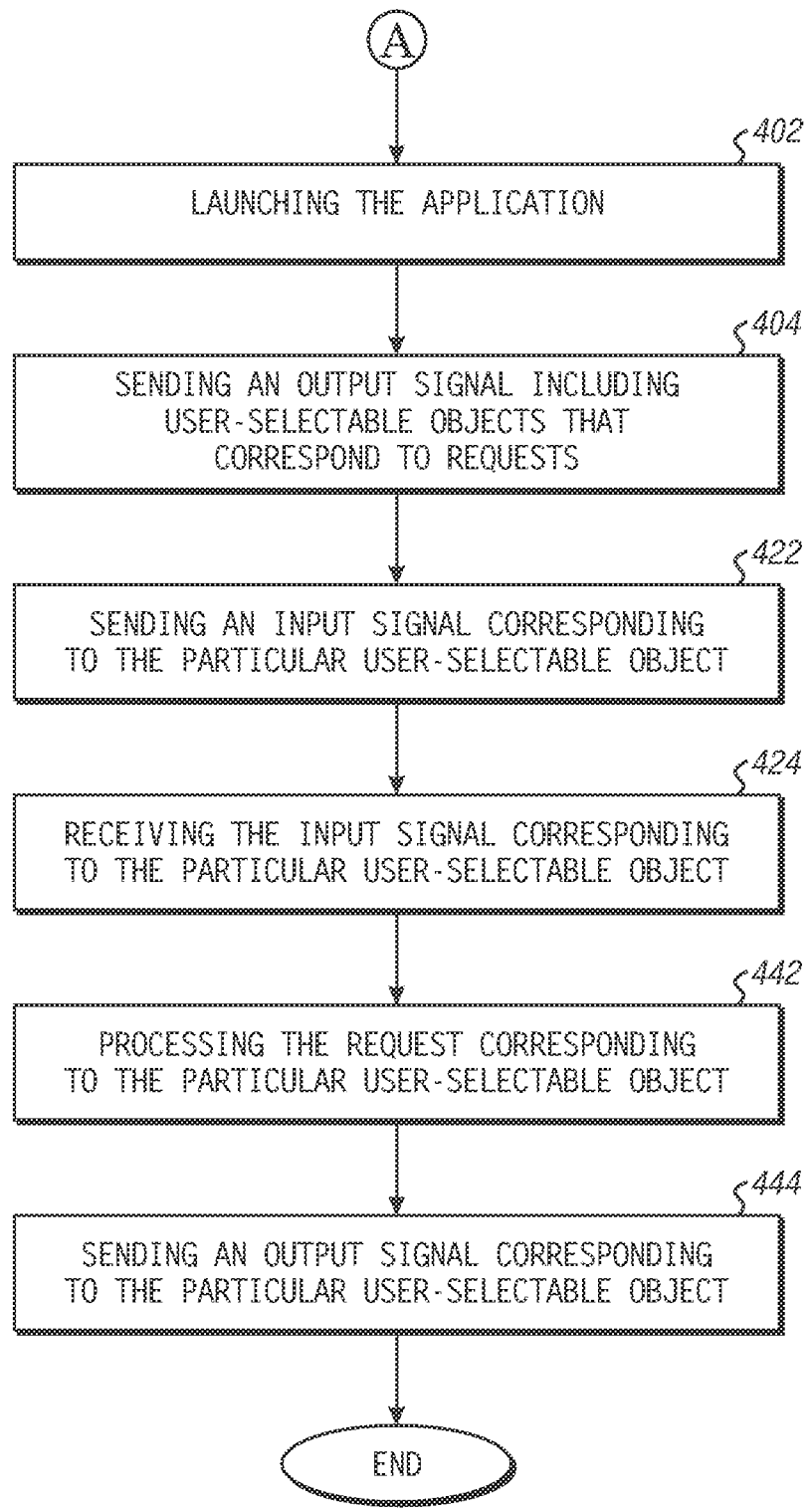
Figure 5:
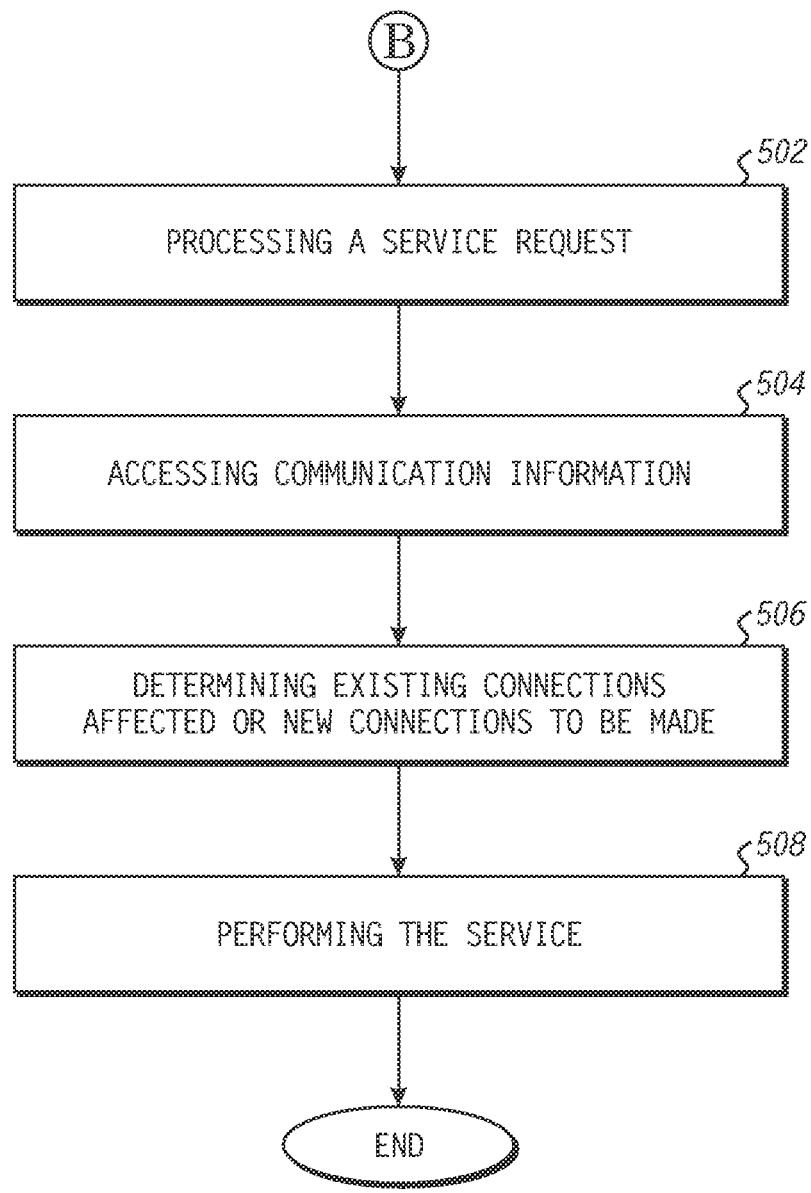
Figure 6:
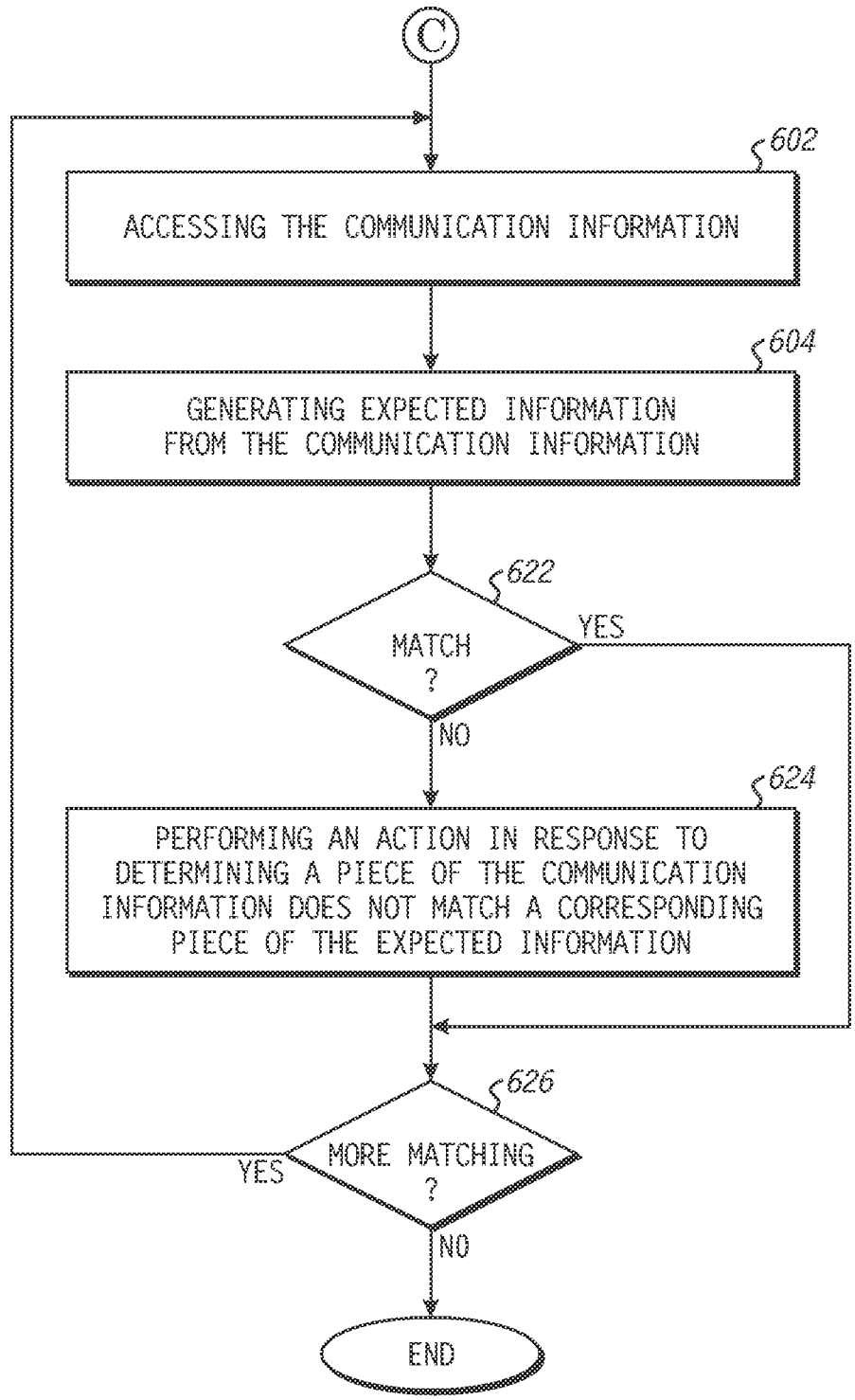

After the communication information is stored, the method can proceed along many different paths, of which, three are illustrated in FIGS. 4, 5, and 6. FIG. 4 is directed to a portion of the method that is particular well suited for browsing by a user in obtaining information regarding MAC identifiers and their relationship with other communication information within the network 100. FIG. 4 will be described with respect to screen shots illustrated in FIGS. 7 to 12. Please note that the information within FIGS. 7 to 12 are exemplary and may or may not be in a proper format. After reading this specification, skilled artisans will appreciate that in another embodiment, actual information in the proper format is used. Also, the pull-down menus and tables in the screen shots may be scrolled up, down, or both to show additional information that would be available to a user but do not appear in the figures as illustrated.

FIG. 5 is directed to a portion of the method for performing service. Portions of the method in FIG. 4 may be used in conjunction with FIG. 5. FIG. 6 is directed to a portion of the method that is particularly well suited for performing an audit of the network 100. The audit may be performed automatically, manually, or a combination thereof. After reading this specification, skilled artisans appreciate that many other methods can be implemented and use the concepts described herein.

Referring to FIGS. 3 and 4, the method can proceed along path "A" and include launching the application, at block 402 of FIG. 4. The application may reside in the storage device 140 and run on the processor 110 of the management system 102. Alternatively, a user (i.e., a human) may be at a client computer coupled to the management system 100, and the application may be run on a processor of the client computer. The actual location of the application and where it runs is not critical to the invention. The application may be launched automatically or may be launched in response to an input by the user. To simplify understanding, the method will be described with respect to the application running on the processor 110 of the management system 102, user input will be received via the input device 130, and output signals for a display will be sent by the output device 120.

Figure 7:
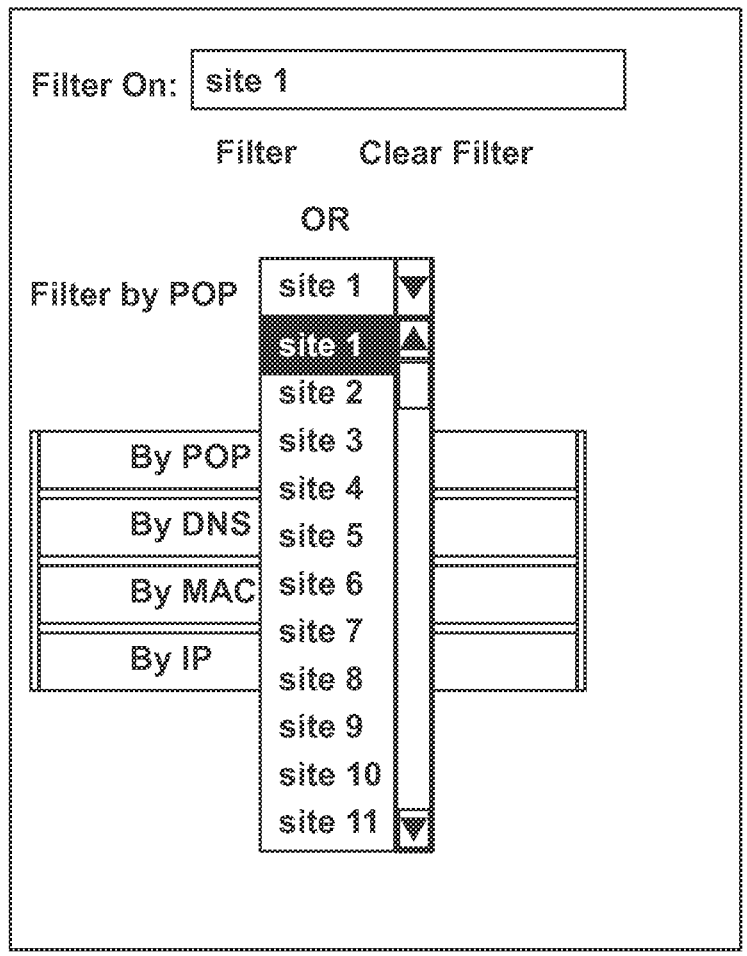

The method can include sending an output signal including user-selectable objects that correspond to requests, at block 404 of FIG. 4. The user-selectable objects can be in the form of entries within a pull-down menu, tiles, hyperlinks, other suitable objects, or any combination thereof. In one embodiment, the communication information may be more useful when first filtered by a geographic location or a logical division. Referring to FIG. 7, a user can be presented with a pull-down menu that includes names or other identifiers of POP servers. In FIG. 7, the POP server corresponds to a geographic location. The user has selected the POP server that services subscribers in a particular city that is also referred to as "Site 1."

After selecting the POP server for that particular city, the user can access the communication information to obtain information as illustrated in FIGS. 8 to 12. In those figures, the left-hand section of the screen shots reflects objects selected by the user, and the right-hand section includes a portion of the communication information, in tabular form, corresponding to the particular object selected by a user.

Therefore, the method can include selecting a particular user-selectable object by the user, which in turn is converted to an input signal. The method can also include sending an input signal corresponding to the particular user-selectable object and receiving the input signal corresponding to the particular user-selectable object, at blocks 422 and 424 in FIG. 4. In one embodiment, the input signal can be sent from a client computer and received by the input device 130 and sent then from the input device 130 to the processor 110 of the management system 102.

At the processor 110, the method can further include processing the request corresponding to the particular user-selectable object, at block 442. The processor 110 can read the request and execute instructions to perform appropriate actions to obtain the appropriate communication information from the storage device 140. The information corresponding to the request can be converted to an output signal. The method can still further include sending the output signal corresponding to the particular user-selectable object, at block 444. The processor 110 can send the output signal to the output device 120, which in turn can display the requested information to the user or can send the output signal to the client computer from which the request originated. The method is better understood with respect to the screen shots that are illustrated in FIGS. 8 to 12. Although the LAN 11 in FIG. 2 does not match the LAN for the particular city (Site 1), references to the LAN 11 may be made to improve understanding of the information within the screen shots.

FIG. 8 includes an illustration of a screen shot where a user has requested all devices associated with the POP server in the particular city. The user-selectable objects can be organized hierarchically into a higher level and one or more lower levels. As illustrated in FIG. 8, the higher level is organized by different categories, such as by mail server (e.g., POP server), by DNS identifier, by MAC identifier, and by network address (e.g., IP address). Within each category, a list of particular items within the category is listed. For example, devices corresponding to the selected mail server are listed under the "by POP" category. As will be described with respect to FIGS. 9 to 12, additional lower levels may lie under the higher level. In the remainder of the description with respect to FIGS. 9 to 12, references will be made to a POP server and IP address, so that the text and figures correspond more closely to each other. After reading this specification, skilled artisans will appreciate that references to a POP server could be replaced by a different type of mail server, and references to an IP address could be replaced by a different type of network address.

Returning to FIG. 8, after the user clicks on "All Devices," a corresponding request is converted to an input signal that is received by the input device 130 and then the processor 110 of the management system 102. The processor 110 executes instructions to obtain information that has been collected for each particular MAC identifier associated with the POP server. Referring briefly to FIG. 2, this would be equivalent to requesting communication information for all devices within the LAN 11. The processor obtains the information and sends the appropriate output signal that is rendered in the screen shot of FIG. 8

Referring to FIG. 8, the information is broken down by tables of information regarding each particular MAC identifier within the LAN for the POP server. Within the right-hand section of FIG. 8, the uppermost table is entitled "02:00:00: 00:EC," which is the MAC identifier for a particular device. The table includes the element identifiers for the traffic handling elements that have information pertaining to the MAC identifier, port or VLAN identifiers through which the traffic handling element has access to the device, a descriptive name for the port or VLAN, the MAC identifier, a manufacturer of the device, a network address corresponding to the MAC identifier, and a DNS identifier associated with the MAC identifier. More, fewer, or different columns may be used.

The first two rows of the uppermost table reflect communication information that the switch, bridge, gateway, or other Layer 2 element has with respect to the particular MAC identifier. The first row corresponds to Layer 3 information that can be obtained from the ARP tables, and the second row corresponds to the Layer 2 information that can be obtained from the MAC tables. Referring to the second row, the device with the MAC identifier of the table is connected to the element named "isr2.site1" at the port named "G12/7," and the port name is "VLAN60_RBK__3/1." Referring briefly to FIG. 2, such information would be similar to element 241 being connected to switch 221 at port $P_1$. The device corresponding to the MAC identifier is made by Redback Networks. The device is using an IP address for a network address, and the IP address is "10.10.73.173," and it is associated with a DNS identifier of "rback2-g1-0.site1."

Similar to the first and second rows, the third row of the uppermost table corresponds to Layer 3 information that can be obtained from the ARP tables, and the fourth row corresponds to the Layer 2 information that can be obtained from the MAC tables. Referring to the fourth row, the device with the MAC identifier of the table is accessible by an element named "isr1.site1" via a trunk bundled interface. Referring briefly to FIG. 2, such information would be similar to element 241 being accessible by switch 222 via port T2, which is connected to the trunk 213.

The middle table in FIG. 8 corresponds to a device that is connected to the element named "isr1.site1" at a port named "G12/7," and is accessible by the element named "isr2.site1" via the trunk bundled interface. Referring briefly to FIG. 2, such information would be similar to element 261 being connected to switch 222 at port $P_1$ and accessible by switch 221 via port T1, which is connected to the trunk 213. The lowest table in FIG. 8 corresponds to a device that is connected to the element named "isr2.site1" at port named "G12/6," and is accessible by the element named "isr1.site1" via the trunk bundled interface. Referring briefly to FIG. 2, such information would be similar to element 242 being connected to switch 221 at port $P_2$ and accessible by switch 222 via port T2, which is connected to the trunk 213.

Figure 9:
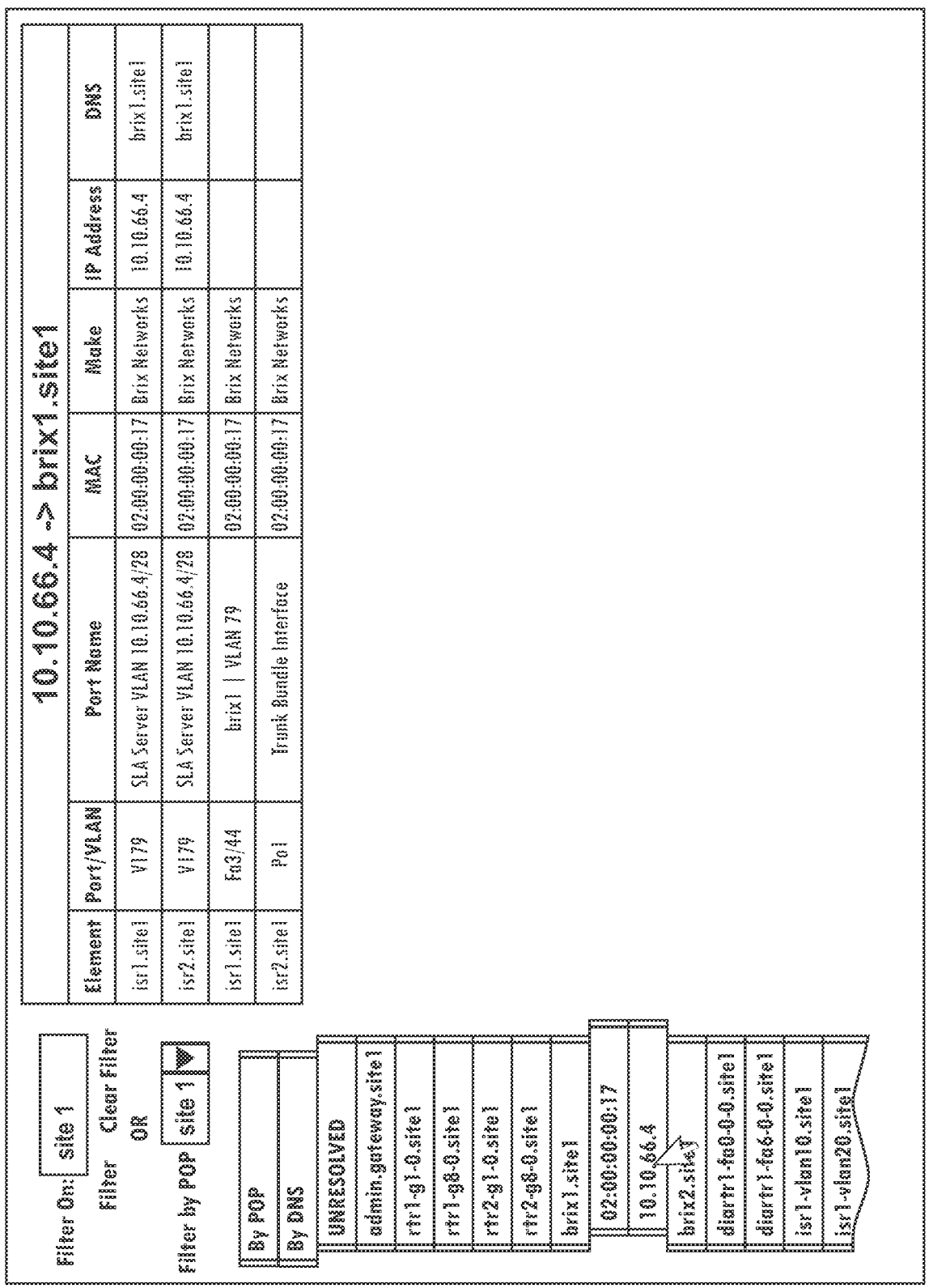

The user can select to see a portion of the communication information by a DNS identifier. Referring to FIG. 9, a user selects a particular DNS identifier and then selects a particular IP address listed under the particular DNS identifier. Alternatively, a user could have selected the particular DNS identifier and then select a particular MAC identifier listed under the particular DNS identifier. Thus, the particular IP address and the particular MAC identifier lie at a lower level than the particular DNS identifier within the DNS category. More specifically, the user selects "brix1.site1" within the DNS category and then selects "10.10.64.4," which is the particular IP address. The table in FIG. 9 is entitled "10.10.64.4→brix1.site1." The tabular information is in a format previously described with respect to FIG. 8.

Figure 10:
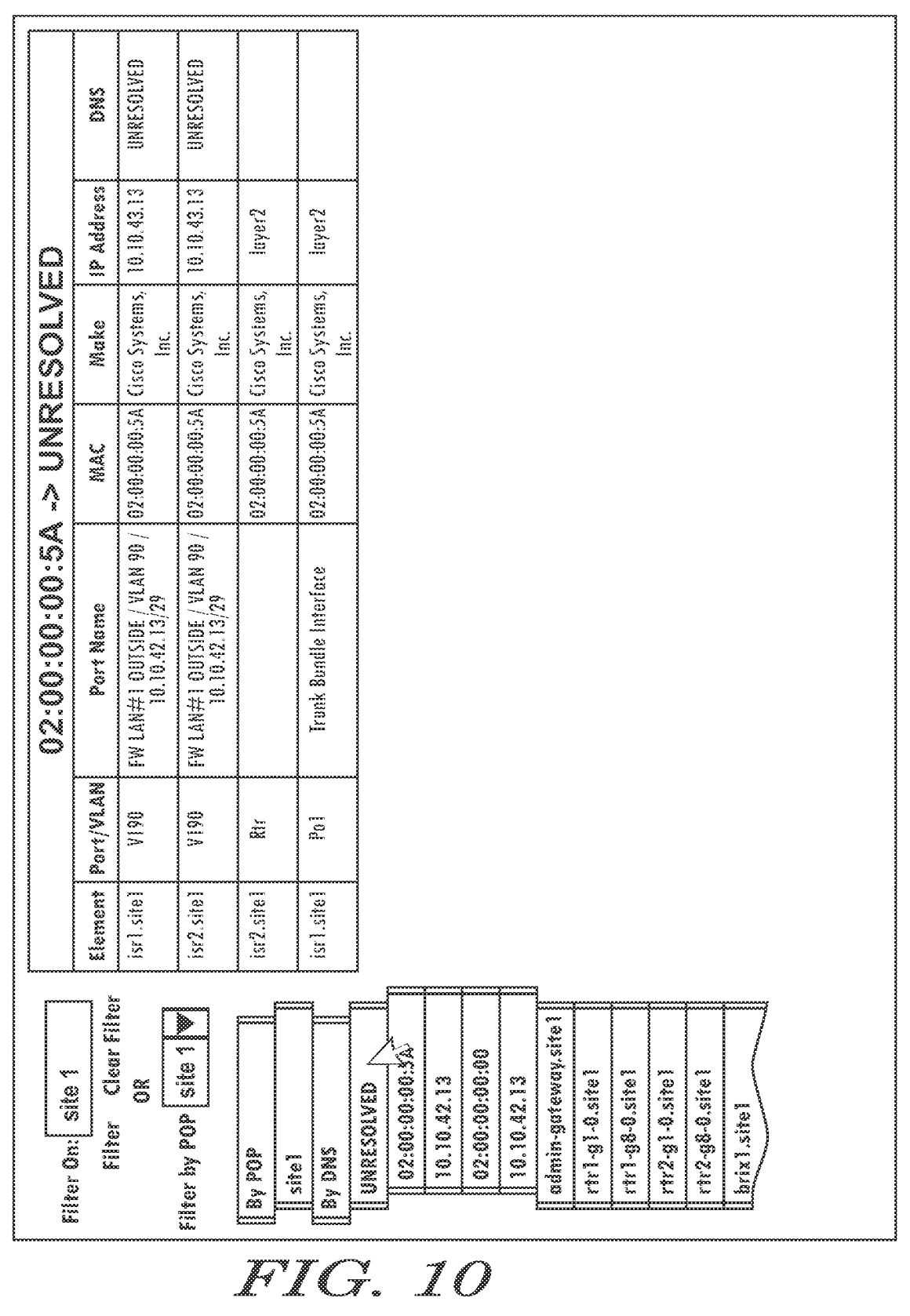

The method and system are particularly useful in detecting potential security breaches or policy violations. Referring to FIG. 10, a user can select "UNRESOLVED" under the DNS category. An entity may have a policy that all elements are to be assigned to a DNS identifier. If a DNS identifier is not found for a particular element, the DNS identifier is listed as unresolved. More specifically, "isr2.site1" is a router that has not yet been assigned a DNS identifier. The table in FIG. 10 is entitled "02:00:00:00:5A→UNRESOLVED," and the DNS identifier is listed as unresolved. Referring briefly to FIG. 2, such a situation could correspond to switch 221 not being assigned a DNS identifier. More description of other similar issues will be described with respect to the audit (FIG. 6).

The user can select to see a portion of the communication information by MAC identifier. Referring to FIG. 1, a user selects a particular MAC identifier, which is 02:00:00:00:00. The table in FIG. 1 is entitled "10.10.73.173→02:00:00:00:00." Alternatively, the user can select to see a portion of the communication information by IP address. Referring to FIG. 12, a user selects a particular IP address, which is 10.10.73.173, and then a MAC identifier address, which is 02:00:00:00:78. The table in FIG. 12 is entitled "02:00:00:00:78→10.10.73.123." Alternatively, a user could have selected the particular IP address and then select a particular DNS identifier listed under the particular IP address. The tabular information is in a format previously described with respect to FIG. 8.

The information obtained from the method is highly useful for a wide variety of different applications. Turning to FIGS. 3 and 5, the method can proceed along path "B" that corresponds to a service request. The method includes processing a service request, at block 502 of FIG. 5. The service request can include routine maintenance, unscheduled maintenance, installing a revision or upgrade, installing a new device, providing other suitable service to the network, or any combination thereof. Thus, the term "service request" is to be interpreted broadly.

The method can include accessing the communication information, at block 504. The process described with respect to FIG. 4 can be used to obtain the relevant information in order to perform the service corresponding to the service request. A user can select the particular device under the POP server category (FIG. 8). Alternatively, if the MAC identifier for the particular device is known, the user could select the particular MAC identifier under the MAC identifier category (FIG. 11). The method can further include determining existing connections affected or new connections to be made, at block 506. The user will be able to read the information and quickly determine other elements of the network that will be affected by the service. The method can include performing the service, at block 508. Thus, the guesswork in determining how a network will be affected during the performance of service can be significantly reduced.

In another application, the information obtained in the tables can be useful in performing an audit of the communication information within the network. The audit can be performed to determine the integrity of the data, detect potential security breaches or policy violations, to perform another suitable function, or any combination thereof. The audit can be performed manually or automatically by the management system 102.

Turning to FIGS. 3 and 6, the method proceeds along path "C." The method includes accessing the communication information, at block 602 in FIG. 6. The communication may be accessed from the storage device 140, an LDAP server, or agents running on the elements within the network 100. The method can also include generating expected information from the communication information, at block 604. The generation of expected information will be described in more detail with respect to some of the information illustrated in FIGS. 8 to 12.

The method can further include determining whether or not a piece of the communication information matches a corresponding piece of the expected information, at decision tree 622. The match does not have to be exact but the piece of the communication information and the corresponding piece of the expected information should not be inconsistent with each other. For example, the description of the port name may or may not include a description of the type of element (e.g., router, switch, gateway firewall, etc.), however, the description of the port name needs to match the entry within the port column of the table. If the piece of the communication information matches the corresponding piece of the expected information ("YES" branch from decision tree 622), a determination is made whether any more matching is to be performed, at decision tree 626. If yes, the method returns to block 602 and continues. If no more matching is to be performed, the method ends.

Returning to decision tree 622, if the piece of the communication information does not match the corresponding piece of the expected information ("NO" branch from decision tree 622), the method further includes performing an action in response to determining that the piece of the communication information does not match the corresponding piece of the expected information, at block 624. The action includes sending an alert to a user, locating the element having the communication information that does not match the expected information, investigating why the particular piece of communication information does not match the corresponding piece of expected information, isolating the element, deactivating the element, determining whether a security breach or policy violation of the network has occurred, compiling a list where the communication information that does not match the expected information, correct the communication information if incorrect communication is discovered, perform another suitable action, or any combination thereof. Other actions beyond those explicitly listed could be performed, and therefore, the actions listed are merely illustrative and do not limit the present invention. After performing the action, the method can proceed to decision tree 626.

Attention is directed to FIGS. 8 to 12 to illustrate information that if missing or incorrect could be flagged by an audit using the method as described with respect to FIG. 6. In FIG. 8, if the Port/VLAN column refers to a VLAN, the IP Address and DNS columns should have entries. Thus, the expected information would be an IP Address and a DNS identifier. If the IP Address, the DNS identifier, or both are missing information or unresolved, the audit would flag the communication information as not matching the expected information. If a Port/VLAN column refers to a port, the IP Address and DNS identifier should not have an IP Address or a DNS identifier because the elements are connected at the Layer 2 (data link) level. For example, the IP Address, the DNS identifier may be left blank or include "Layer 2" or other similar notation.

Referring to the third row of FIG. 10, the absence of an entry within the port name column indicates that the MAC identifier corresponds to the element. In other words, isr2.site1 has "02:00:00:00:5A" as its MAC identifier. Referring to the first two rows of FIG. 10, the audit will also determine that "UNRESOLVED" for the DNS identifier would not be expected.

Referring to FIG. 11, a couple of items do not match. More particularly, the description of the port name in the first row does not match the element and port name in the fifth row. In this particular example, "Cat 1" may have been the prior name for isr2.site1, which may currently be called "ISR 2." With respect to the port, the description includes "4/4," whereas the actual port is "3/4." The audit can detect the element name and port name as not matching.

Referring to FIG. 12, each of the elements named "isr2.site1" and "isr1.site1" should include information from the ARP (Layer 3) and MAC (Layer 2) tables. The element named "isr2.site1" has two rows, which would be expected, whereas the element named "isr1.site1" has only one row. Thus, the communication information from the ARP table for that element is missing. The audit can detect the missing row as not matching expected information.

After reading this specification, skilled artisans will appreciate that the communication information can be used in many applications including those described herein and others. The tabular information allows for faster acquisition and processing as compared to making graphical representations of the network. The tabular information is more useful when communication information regarding a service provider's network is needed quickly. Additionally, problems or other issues that may go undetected when making the graphical representation can be readily detected using the methods herein.

Many different aspects and embodiments are possible. Some of those aspects and embodiments are described below. After reading this specification, skilled artisans will appreciate that those aspects and embodiments are only illustrative and do not limit the scope of the present invention.

In a first aspect, a method of reviewing network information can include accessing communication information, wherein the communication information includes media access controller identifiers of elements within a network, network addresses used by the elements within the network, and coupling identifiers corresponding to couplings between different elements within the network. The method can also include determining whether or not a particular piece of the communication information matches a corresponding piece of expected information, wherein the expected information includes information that would be expected based upon a portion of the communicated information, including a corresponding media access controller identifier, a corresponding network address, a corresponding coupling identifier, or any combination thereof.

In one embodiment of the first aspect, receiving the communication information includes receiving a first media access control identifier of a first element within a network, receiving a first network address corresponding to the first media access control identifier, and receiving a first coupling identifier corresponding to a coupling between the first element and another element within the network. In a particular embodiment, receiving the communication includes receiving Layer 2 and Layer 3 information from the other element. In another particular embodiment, receiving the communication information includes receiving information obtained from address resolution protocol tables and media access control tables of the different elements within the network. In another embodiment, receiving the communication information includes receiving domain name service identifiers, and determining whether or not the particular piece of the communication information matches the corresponding piece of expected information includes determining that a particular domain name service identifier associated with a particular element of the network is unresolved.

In a further embodiment of the first aspect, the method further includes performing an action in response to determining the particular piece of the communication information does not match the corresponding piece of the expected information. In a particular embodiment, performing the action includes investigating why the particular piece of the communication information does not match the corresponding piece of the expected information. In another particular embodiment, performing the action includes locating a particular element of the network. In still another particular embodiment, performing the action further includes isolating or deactivating a particular element of the network. In a further particular embodiment, performing the action further includes determining whether a potential security breach or policy violation of the network has occurred.

In a second aspect, an information handling system can include local area networks operable to be used by subscribers of a service provider, and a management system coupled to the local area networks. The management system can include a storage device including communication information, wherein the communication information includes media access controller identifiers, network addresses, and coupling identifiers corresponding to couplings between different elements within the network. The communication information could have been obtained from communications between different elements in different local area networks. The management system can also include a processor configured to generate expected information from a portion of the communication information, wherein the expected information includes information that would be expected based upon a portion of the communicated information, including a corresponding media access controller identifier, a corresponding network address, a corresponding coupling identifier, or any combination thereof, and to determine whether or not a particular piece of the communication information matches a corresponding piece of the expected information.

In one embodiment of the second aspect, the processor is further configured to perform an action in response to determining that the particular piece of the communication information does not match the corresponding piece of the expected information.

In a third aspect, a processor readable medium can have code to be used in association with a user interface, wherein the code is embodied within the processor readable medium. The code can include an instruction to send a first output signal to be displayed on a display, wherein the first output display signals includes user-selectable objects corresponding to requests for information associated with media access control identifiers within a network. The code can further include an instruction to process a first request in response to receiving an input signal corresponding to a first user-selectable object. The code can still further include an instruction to send a second output signal to be displayed on the display in response to the first request, wherein the second output signal includes tabular information regarding a first media access control identifier.

In one embodiment of the third aspect, the user-selectable objects are configured to be displayed in a form of entries within a pull-down menu or tiles. In another embodiment, the user-selectable objects are organized at a first level by geographic location, mail server, domain name service identifier, media access control identifier, network address, or any combination thereof. In a particular embodiment, some of the user-selected objects are organized at a second level by media access control identifier, wherein the second level lies at a lower hierarchical level as compared to the first level.

In a further embodiment of the third aspect, the second display signal corresponds to collected information at a traffic handling element within the network. In a particular embodiment, the second display signal corresponds to the collected information that includes information from a media control access table and an address resolution protocol table. In another particular embodiment, the tabular information includes an element identifier for the traffic handling element, a port or VLAN identifier through which the traffic handling element has access to a device corresponding to the first media access control identifier, a name for the port or VLAN, the first media access control identifier, a manufacturer of the device corresponding to the media access control identifier, a network address corresponding to the media access control identifier, a domain name service identifier associated with the media access control identifier, or any combination thereof. In still another particular embodiment, the tabular information includes an element identifier for the traffic handling element, a port or VLAN identifier through which the traffic handling element has access to a device corresponding to the first media access control identifier, the first media access control identifier, and a network address corresponding to the media access control identifier.

In a fourth aspect, a processor readable medium can have code embodied therein. The code can include an instruction to request or send communication information from traffic handling elements within a network. The traffic handling elements can include elements that handle communications between a source element and a destination element, wherein the traffic handling element, the source element, and the destination element are different from one another. The communication information can include media access control identifiers of elements within a network, network addresses of elements within the network, coupling identifiers corresponding to couplings between different elements within the network, or any combination thereof. A first element of the network can be connected to the network and have a corresponding network address, but the first element may not have yet sent its corresponding network address since a time that a then-current coupling between the first element and the network has been made.

In one embodiment of the fourth aspect, the communication information further includes a domain name service identifier. In another embodiment, the instruction to request or send the communication information from the traffic handling elements includes an instruction to request or send the communication information only from the traffic handling elements. In still another embodiment, the code further includes an instruction to produce network coupling information sufficient to properly service a particular element within the network.

In a further embodiment of the fourth aspect, the code further includes an instruction to generate expected information from a portion of the communication information. The expected information includes information that would be expected based upon a portion of the communicated information, including a corresponding media access controller identifier, a corresponding network address, a corresponding coupling identifier corresponding to couplings between different elements within the network, or any combination thereof. The code can also include an instruction to determine whether a particular piece of the communication information matches a corresponding piece of the expected information.

In a particular embodiment of the fourth aspect, the code can further include an instruction to perform an action in response to determining that the particular piece of the communication information does not match the corresponding piece of the expected information. In a more particular embodiment, the instruction to perform an action includes an instruction to determine whether a policy violation has occurred. In another more particular embodiment, the instruction to perform an action includes an instruction to isolate a particular element within the network or an instruction to deactivate the particular element within the network.

The description and the figures are provided to assist in understanding the teachings disclosed herein. The discussion focuses on specific implementations and embodiments of the teachings to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

In the description, a flow charted technique has been described in a series of sequential actions. The sequence of the actions and the party performing the steps may be freely changed without departing from the scope of the teachings. Actions may be added, deleted, or altered in several ways. Similarly, the actions may be re-ordered or looped. Further, although processes, methods, algorithms or the like may be described in a sequential order, such processes, methods, algorithms, or any combination thereof may be operable to be performed in alternative orders. Further, some actions within a process, method, or algorithm may be performed simultaneously during at least a point in time (e.g., actions performed in parallel), can also be performed in whole, in part, or any combination thereof.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of reviewing network information comprising:
receiving communication information for a plurality of network elements from routers and switches within a plurality of local area networks, wherein the communication information includes layer 2 information including media access controller identifiers of elements within a network, layer 3 information including network addresses used by the elements within the network, and coupling identifiers corresponding to couplings between different elements within the network;
storing the communication information;
determining that a portion of the layer 2 information and the layer 3 information is expected information;
determining, by utilizing instructions from memory that are executed by a processor, whether a particular piece of the layer 2 and layer 3 information matches a corresponding piece of expected information to identify stored information that is incorrect, and policy violations, wherein the particular piece of the layer 2 and layer 3 information is determined to match the corresponding piece of the expected information when at least a portion of the particular piece of the layer 2 and layer 3 information matches a subset of the corresponding piece of the expected information, wherein the subset includes a description of an expected port name that includes a description of a type of each of the plurality of network elements;

compiling, if the particular piece of the layer 2 and layer 3 information is determined to not match the corresponding piece of expected information, a list that indicates that the particular piece of the layer 2 and layer 3 information does not match the corresponding piece of the expected information; and correcting the communication information if the particular piece of the layer 2 and layer 3 information is determined to not match the corresponding piece of expected information.

2. The method of claim 1, wherein receiving the layer 2 information and the layer 3 information comprises receiving information obtained from address resolution protocol tables and media access control tables of the different elements within the network.

3. The method of claim 1, further comprising:
receiving domain name service identifiers; and
determining whether or not the particular piece of the layer 2 and layer 3 information matches the corresponding piece of expected information comprises determining that a particular domain name service identifier associated with a particular element of the network is unresolved.

4. The method of claim 1, further comprising performing an action in response to determining the particular piece of the layer 2 and layer 3 information does not match the corresponding piece of the expected information.

5. The method of claim 4, wherein performing the action comprises investigating why the particular piece of the layer 2 and layer 3 information does not match the corresponding piece of the expected information.

6. The method of claim 4, wherein performing the action comprises locating a particular element of the network.

7. The method of claim 4, wherein performing the action further comprises isolating or deactivating a particular element of the network.

8. The method of claim 4, wherein performing the action further comprises determining whether a potential security breach or policy violation of the network has occurred.

9. An information handling system comprising:
local area networks operable to be used by subscribers of a service provider; and
a management system coupled to the local area networks, the management system comprising:
a storage device comprising layer 2 information, layer 3 information, and coupling identifiers, wherein the layer 2 information includes media access controller identifiers, the layer 3 information includes network addresses, and coupling identifiers corresponding to couplings between different elements within the network, wherein the layer 2 information and the layer 3 information has been provided by routers and switches in a plurality of local area networks, and the layer 2 information and the layer 3 information relates to a plurality of network elements in the local area networks, wherein the layer 2 information and layer 3 information are contained within communication information; and
a processor that executes instructions from memory to perform operations, the operations comprising:
determining that a portion of the layer 2 information and the layer 3 information is expected information;
determining whether a particular piece of the layer 2 information or the layer 3 information matches a corresponding piece of the expected information to identify stored information that is incorrect, and policy violations, wherein the particular piece of the layer 2 and layer 3 information is determined to match the corresponding piece of the expected information when at least a portion of the particular piece of the layer 2 and layer 3 information matches a subset of the corresponding piece of the expected information, wherein the subset includes a description of an expected port name that includes a description of a type of each of the plurality of network elements;
compiling, if the particular piece of the layer 2 and layer 3 information is determined to not match the corresponding piece of expected information, a list that indicates that the particular piece of the layer 2 and layer 3 information does not match the corresponding piece of the expected information; and
correcting the communication information if the particular piece of the layer 2 and layer 3 information is determined to not match the corresponding piece of expected information.

10. The system of claim 9, wherein the operations further comprise:
receiving domain name service identifiers; and
determining whether or not the particular piece of the layer 2 and layer 3 information matches the corresponding piece of expected information comprises determining that a particular domain name service identifier associated with a particular element of the network is unresolved.

11. The system of claim 9, wherein the operations further comprise performing an action in response to determining the particular piece of the layer 2 and layer 3 information does not match the corresponding piece of the expected information.

12. The system of claim 11, wherein performing the action further comprises investigating why the particular piece of the layer 2 and layer 3 information does not match the corresponding piece of the expected information.

13. The system of claim 11, wherein performing the action further comprises locating a particular element of the network.

14. The system of claim 11, wherein performing the action further comprises isolating or deactivating a particular element of the network.

15. The system of claim 11, wherein performing the action further comprises determining whether a potential security breach or policy violation of the network has occurred.

16. A non-transitory storage medium including instructions that are executed by a processor to perform operations, the operations comprising:
receiving communication information for a plurality of network elements from routers and switches within a plurality of local area networks, wherein the communication information includes layer 2 information including media access controller identifiers of elements within a network, layer 3 information including network addresses used by the elements within the network, and coupling identifiers corresponding to couplings between different elements within the network;
storing the communication information;
determining that a portion of the layer 2 information and the layer 3 information is expected information; and
determining whether a particular piece of the layer 2 and layer 3 information matches a corresponding piece of expected information to identify stored information that is incorrect, and policy violations, wherein the particular piece of the layer 2 and layer 3 information is determined to match the corresponding piece of the expected information when at least a portion of the particular piece of the layer 2 and layer 3 information matches a subset of the corresponding piece of the expected information, wherein the subset includes a description of an expected port name that includes a description of a type of each of the plurality of network elements;

compiling, if the particular piece of the layer 2 and layer 3 information is determined to not match the corresponding piece of expected information, a list that indicates that the particular piece of the layer 2 and layer 3 information does not match the corresponding piece of the expected information; and correcting the communication information if the particular piece of the layer 2 and layer 3 information is determined to not match the corresponding piece of expected information.

17. The non-transitory storage medium of claim 16, wherein in receiving the layer 2 information and the layer 3 information, wherein the operations further comprises receiving information obtained from address resolution protocol tables and media access control tables of the different elements within the network.

18. The non-transitory storage medium of claim 16, wherein the operations further comprises:
   receiving domain name service identifiers; and
   determining whether or not the particular piece of the layer 2 and layer 3 information matches the corresponding piece of expected information comprises determining that a particular domain name service identifier associated with a particular element of the network is unresolved.

19. The non-transitory storage medium of claim 16, the operations further comprises:
   performing an action in response to determining the particular piece of the layer 2 and layer 3 information does not match the corresponding piece of the expected information.

* * * * *